(12) United States Patent
Ancel

(10) Patent No.: US 6,309,036 B1
(45) Date of Patent: Oct. 30, 2001

(54) JOINERY MOLDING

(76) Inventor: Douglas R. Ancel, 3849 E. Worth Rd., Pinconning, MI (US) 48650

( * ) Notice: Subject to any disclaimer, the term of this patent is extended or adjusted under 35 U.S.C. 154(b) by 0 days.

(21) Appl. No.: 09/663,654

(22) Filed: Sep. 18, 2000

Related U.S. Application Data

(62) Division of application No. 09/196,254, filed on Nov. 18, 1998, now Pat. No. 6,220,677.

(51) Int. Cl.⁷ .................................................. A47B 96/18
(52) U.S. Cl. ..................... 312/140.4; 52/287.1; 52/716.1
(58) Field of Search ........................... 52/716.1, 716.2, 52/716.8, 717.05, 287.1, 254, 290, 312; 312/140.4, 140.1; 108/27

(56) References Cited

U.S. PATENT DOCUMENTS

| | | | | |
|---|---|---|---|---|
| 167,910 | * | 9/1875 | Lancaster | 52/716.1 |
| 2,300,084 | | 10/1942 | Wright | 20/74 |
| 2,303,864 | * | 12/1942 | Reasor | 52/716.2 |
| 2,697,019 | | 12/1954 | Stefan | 311/103 |
| 2,785,937 | | 3/1957 | Murray | 311/103 |
| 2,895,778 | | 7/1959 | Lieber | 311/106 |
| 3,606,508 | | 9/1971 | Burnes | 312/140.3 |
| 4,347,793 | | 9/1982 | Rajnert | 108/27 |
| 4,829,730 | | 5/1989 | Zeilinger | 52/288 |
| 5,452,666 | | 9/1995 | Peters | 108/27 |
| 5,819,485 | * | 10/1998 | Lane et al. | 52/716.1 |

* cited by examiner

Primary Examiner—Peter M. Cuomo
Assistant Examiner—Jerry A. Anderson
(74) Attorney, Agent, or Firm—John J. Swartz

(57) ABSTRACT

An elongate back splash molding including a horizontal leg, adapted to be received in an upwardly opening notch provided in a counter top, and a vertical leg, integral with the horizontal leg, adapted to be received by a downwardly opening notch provided in a back splash which is mounted on the counter top rearwardly adjacent the slot. The horizontal leg includes a curvilinear top surface and a front surface joined to the curvilinear surface at via an edge which lies flush with the upper surface of the counter top. The vertical leg includes a front curvilinear surface having a lower end which makes a smooth transition with the curvilinear top surface. The vertical leg also includes an elongate top end face which is downwardly forwardly inclined and is joined to the top front surface along an edge which is flush with the front face of the back splash and an upper end disposed flush with the front face of the back splash. The confronting surfaces of the counter top, back splash and back splash molding, which are formed of non-laminated, non-foamed, non-coated, plastic solid surfacing material, are adhesively joined to provide a water impervious, virtually imperceptible joint.

16 Claims, 3 Drawing Sheets

JOINERY MOLDING

This is a divisional of application Ser. No. 09/196,254 filed on Nov. 18, 1998, now U.S. Pat. No. 6,220,677.

BACKGROUND OF THE INVENTION

1. Field of the Invention

This invention relates to a joinery molding and method of joining an upstanding panel, such as a back splash to a base, such as a counter top, and more particularly, to a non-laminated, plastic, solid surface cove molding for joining two 90° related parts such as a back splash mounted on a non-laminated, plastic, solid surface counter top.

2. Description of the Prior Art and Objects

Counter tops for kitchens, bathrooms, and the like are normally installed with a back splash which extends upwardly a short distance above the counter top work surface. It has been conventional to provide a cove molding at the junction of a laminated counter top and laminated back splash such as that disclosed, for example, in U.S. Pat. No. 2,785,937, issued to H. B. Murray on Mar. 19,1997 and U.S. Pat. No. 4,829.730 issued to Allen Zeilinger on May 16, 1989.

In recent years, countertops and back splashes have frequently been manufactured with non-laminated, plastic, solid surfacing material which is preferable by consumers in many instances because of its finish, cleaning ability, high durability and aesthetics. Such plastic solid surfacing materials are sold under the trademark "CORIAN" which is owned by the E.I. DuPont de Nemours and Co., Inc., of Wilmington, Del. This product is described in U.S. Pat. No. 5,452,666 issued to Chris R. Peters on Sep. 26, 1995 and U.S. Pat. No. 3,847,865 issued to R. B. Duggins on Nov. 12, 1974, which are incorporated herein by reference. The product is a substantially rigid, non-foamed, non-laminated, non-coated solid material composed primarily of acrylic components.

The aforementioned U.S. Pat. No. 5,452,666 discloses a counter top and back splash, manufactured with CORIAN material, having a cove lip integral with the back splash and received in a dado provided in the upper surface of the counter top. The prior art integral back splash construction has several disadvantages including the complexity of manufacture and the susceptibility of breakage and expense. If a user wants to couple a relatively short portion of a back splash to a counter top, the prior art construction cost is relatively high because the back splashes are typically manufactured in 12 foot sections and thus a relatively expensive back splash and molding must be purchased in order to accommodate the short section required. Moreover, the integral cove lip and back splash, disclosed in U.S. Pat. No. 5,452,666, restricts the interchange of back splashes of different materials which can be utilized with the CORIAN material counter top. Accordingly, it is an object of the present invention to provide a new and novel joinery molding for joining two right angularly related parts.

It is an object of the present invention to provide a new and novel cove molding for joining a back splash and a counter top.

It is another object of the present invention to provide a new and novel joinery method of joining two right angularly related parts.

It is another object of the present invention to provide a new and novel cove molding which, prior to installation, is independent of the back splash and counter top.

It is still another object of the present invention to provide a new and novel cove molding, and method of installing a cove molding, which can couple a non-laminated plastic solid surface base to any selected one of a plurality of different upstanding panel of different materials.

It is yet another object of the present invention to provide a molding and method of installing a molding which has a horizontal leg that is received in a slot provided in an upper surface of a horizontal base, such as a counter top, to be joined to an upstanding panel, such as a back splash.

It is a further object of the present invention to provide a molding and method of installing a molding of the type described comprising a horizontal leg including a top surface having a front end which is disposed flush with the upper surface of a base, such as a counter top, to be joined to an upstanding panel, such as a back splash.

It is a still further object of the present invention to provide a back splash molding and method of installing a cove molding of the type described including a horizontal leg having a front face provided with an upper end which is disposed in the plane of the upper surface of the counter top.

It is still another object of the present invention to provide a back splash molding and method of installing a cove molding of the type described including a front face and a curvilinear top face which are joined along an upper front edge which is flush with the upper surface of the counter top.

Still another object of the present invention is to provide a molding of the type described including a vertical leg having an elongate upper end surface which is downwardly forwardly inclined.

It is still further another object of the present invention to provide a molding of the type described including a curvilinear front surface which has an upper end that lies in the plane of the front surface of an upstanding panel to be joined to a horizontal base.

Another object of the present invention is to provide an elongate cove molding and method of installing a cove molding which has a vertical leg provided with an elongate, downwardly forwardly inclined upper end surface having a forward end which lies in the plane of the front surface of an upstanding panel.

Another object of the present invention is to provide a back splash molding including an upstanding leg having a front curvilinear surface and a top downwardly inclined surface joined at an edge which lies in the plane of the front surface of the back splash molding.

Another object of the present invention is to provide a horizontal non-laminated plastic solid surface counter top having an upwardly opening recess adjacent a rear edge thereof, a back splash having the lower front end portion provided with a downwardly and forwardly opening notch therein, and an elongate cove molding having a horizontal leg received by the upwardly opening recess and an upstanding leg received by the downwardly opening notch in the back splash.

It is yet another object of the present invention to provide a molding strip for sealing a solid surface counter top to any one of a plurality of different back splashes via adhesive placed therebetween to provide a tightly closed, virtually imperceptible joint therebetween.

It is another object of the present invention to provide a cove molding of the type received which has a vertical leg received in a downwardly forwardly opening notch provided in an upstanding panel to be joined to a horizontal base.

It is a further object of the present invention to provide a cove molding of the type described having a vertical leg received in a notch provided in the back splash and cooperating male and female members on the back splash and the vertical leg for precluding relative forward movement of the cove molding relative to the back splash.

With continued use and the settling of building materials, etc., it frequently occurs with the prior art counter tops and back splashes, that the moldings, back splashes and countertops tend to move and separate relative to each other. It is a further object of the present invention to provide a new and novel cove molding of the type described which will interlock the counter top to the cove molding to prevent relative movement therebetween.

It is another object of the present invention to provide a method of installing a solid surface joinery molding which will lock a base, such as a counter top, to an upstanding panel, such as a back splash, to inhibit relative movement thereof.

It is another object of the present invention to provide a method of installing a cove molding which will lock the molding to a base and an upstanding panel to be joined thereto.

It is another object of the present invention to provide a method of installing a back splash molding in a downwardly opening notch provided in a back splash so that the upper front end of the vertical cove molding leg is flush with the front back splash surface.

It is another object of the present invention to provide a joinery method and apparatus for joining a solid surface base, such as a counter top to an upstanding panel mounted thereon, such as a back splash which is relatively thin.

Other objects and advantages of the present invention will become apparent to those of ordinary skill in the art as the description thereof proceeds.

SUMMARY OF THE INVENTION

An elongate one-piece joinery molding for joining a base, such as a counter top, to an upstanding panel, such as a back splash, and method of joining the base and panel via a one-piece back splash molding comprising a horizontal leg having a front face and a curvilinear top face joined to the front face along a forward upper edge, and a vertical leg, integral with the horizontal leg, having a front curvilinear face joined to the curvilinear top face to provide a smooth interface therebetween and a top end surface joined to the front curvilinear surface, the top end surface of the vertical leg being forwardly downwardly inclined.

DESCRIPTION OF THE DRAWINGS

The invention may be more readily understood by referring to the accompanying drawings, in which.

DESCRIPTION OF PREFERRED EMBODIMENT

Figure 1:
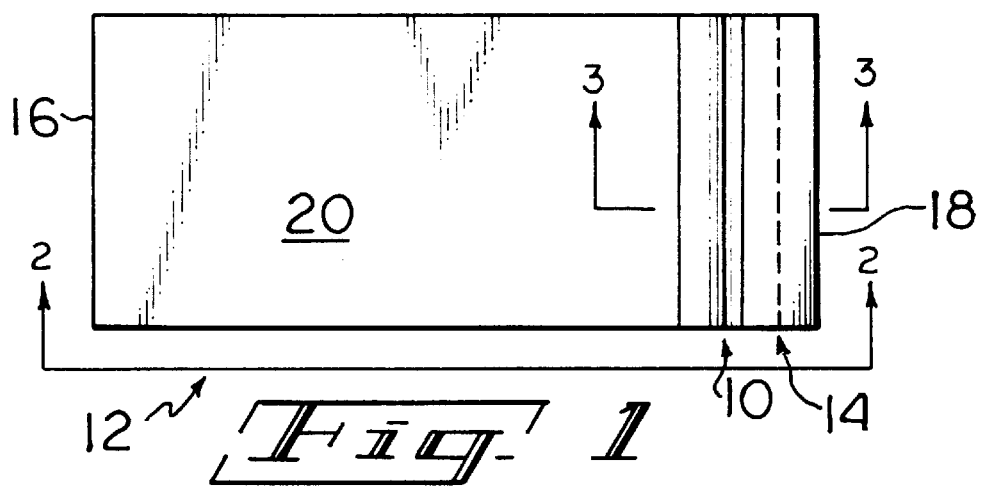
FIG. 1 is a top plan view of a counter top mounting a back splash and back splash molding constructed according to the present invention.
Figure 2:
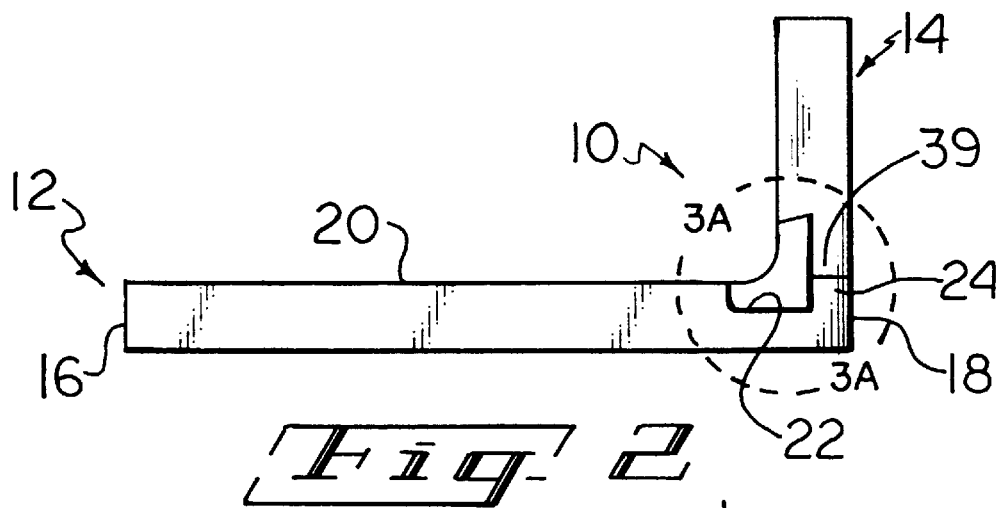
FIG. 2 is a front elevational view thereof, taken along the line 2—2 of FIG. 1.

A cove molding, generally designated 10, constructed according to the present invention, is particularly adapted for joining a base, such as a counter top slab, generally designated 12, and an upstanding panel, such as a back splash, generally designated 14, all of which preferably comprise non-laminated, non-foamed, non-coated, plastic solid surfacing material, commonly sold under the trademark CORIAN. The counter top 12 includes a front end 16, a rear end 18, and a top planar surface 20 lying in a horizontal plane 21. The top surface 20 includes a rear edge shoulder 24 which projects a distance 25 forwardly of the rear end 18, and an elongate, upwardly opening recess, slot or dado, generally designated 22, disposed forwardly adjacent the shoulder 24. The slot 22 includes a vertical front wall 26, a vertical rear wall 28, and a bottom planar wall 30, spanning the front wall 26 and the rear wall 28.

Figure 3:
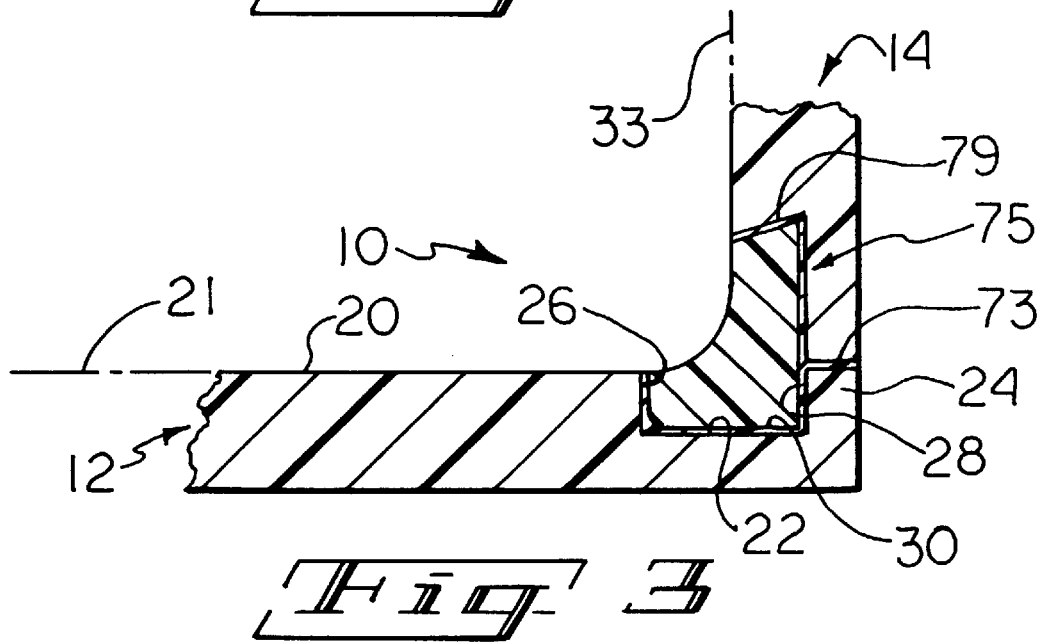
FIG. 3 is an enlarged, fragmentary sectional side view, taken along the section line 3—3 of FIG. 1.

The upstanding back splash 14 includes front and rear vertical faces 32 and 34, respectively, and a lower rear portion 39 having a bottom end wall or face 36 supported on the rear edge shoulder 24 of counter top 12. The front back splash face 32 lies in a vertical plane 33 (FIG. 3). The depth 38 of the rear back splash portion 39 is substantially equal to the depth 25 of the counter top shoulder 24.

Although the back splash faces 32, 34 are illustrated as being in substantially parallel planes, it should be understood that the vertical building wall (not shown) on which the back splash 14 is mounted may not be planar but may include slight forward and/or rearward undulations or variations therein. The back splash 14 is shaped to conform to the contour of the building wall against which it abuts. Also, the rear end 18 of the counter top will be cut to follow the contour of the building wall and thus may have some slight front to rear undulations therein. The slot rear wall 28 will uniformly remain a distance 25 forwardly of the counter top rear edge 18.

Figure 3A:
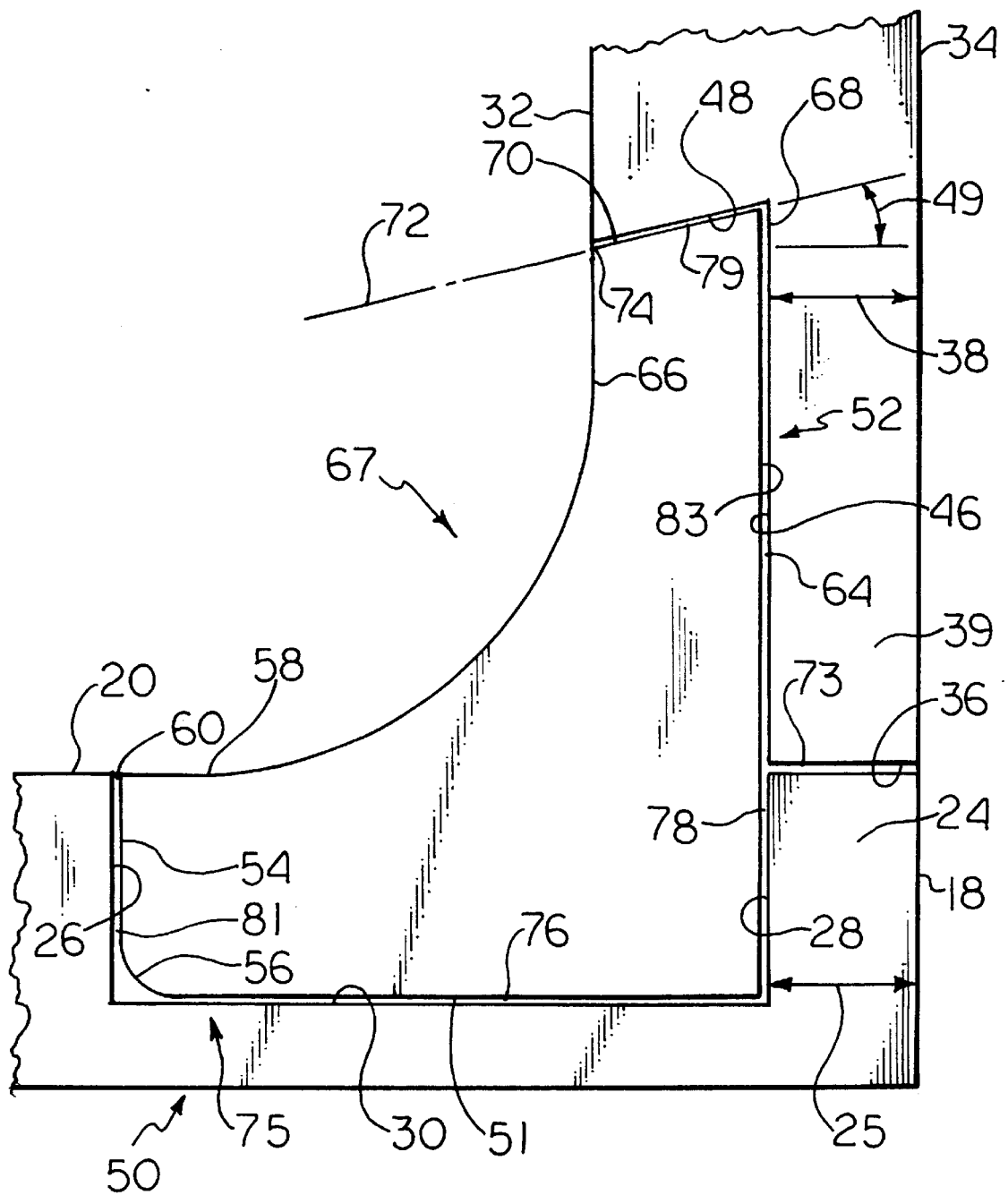
FIG. 3A is a greatly enlarged side elevational view encircled in the chain line circle 3A—3A of FIG. 2.
Figure 4:
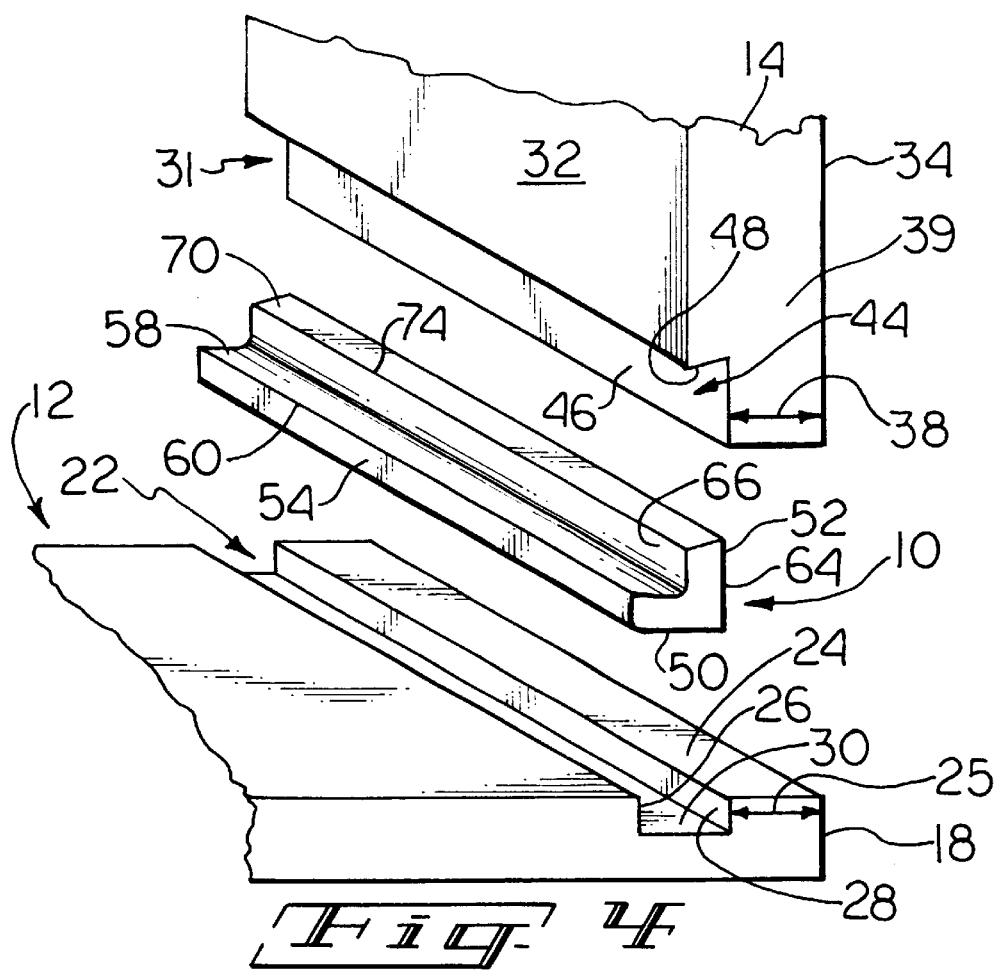
FIG. 4 is an enlarged, exploded view of the counter top, back splash and back splash molding prior to assembly.

A lower front portion 31 of the front back splash face 32 and the bottom back splash face 36 are conjointly cut away to provide a downwardly and forwardly opening notch, generally designated 44, having a back wall 46 and an upper end wall 48. As illustrated in FIG. 3, the plane 33 of the back splash front face 32 intersects the counter top slot 22 and lies between the front and rear counter top slot walls 26 and 28, respectively. The back splash notch upper end wall 48 is downwardly forwardly inclined at an angle 49 (FIG. 3A) of approximately 14° to the horizon to provide a stop for the cove molding as will to be described more particularly hereinafter.

The cove molding 10, which may be generally characterized as having an L-shape, is one-piece and includes an elongate horizontal leg, generally designated 50, and an elongate, integral vertical leg, generally designated 52. The horizontal cove molding leg 50 includes a generally planar bottom surface 51, spaced from but confronting the bottom slot surface or face 30, and an upstanding front surface 54 which confronts, but is slightly spaced from the front slot surface 26. The front cove mold surface 54 includes a lower curvilinear surface portion 56 which is joined to the bottom planar surface 52.

The horizontal leg 50 also includes a curvilinear top surface or face 58. The forward terminal end of top face 58 and the upper end of the front surface 54 intersect at a front upper edge 60 which lies in the plane 21 of the top counter surface 20 and is flush with the top surface 20.

The vertical leg 52 includes an upstanding planar back wall or face 64 and a curvilinear front wall or face 66 which has the same radius of curvature as the top front wall 58 and, as illustrated, forms a smooth curvilinear transition therewith to provide a curvilinear interface, generally designated 67, between the vertical and horizontal legs and defines a smooth curvilinear interface between the back splash 14 and the counter top 12.

The vertical cove molding leg 52 includes an upper elongate end 68 having a planar elongate top wall face 70 which lies in a plane 72 that is inclined downwardly forwardly at the same angle 49 as is the angle of inclination of the notch end wall 48. The planar face 70 is parallel to and slightly spaced from the notch end wall 48.

The front of the top face 70 and top of the front face 66 are joined at an upper forward edge 74 which lies in the plane 33 of front back splash face 32 and is flush with the front face of back splash face 32. The downwardly forwardly inclined upper end face 70 of the cove molding 10 cooperates with the female receptacle, provided at the upper end of notch 44, to provide interlocking surfaces which precludes or stops forward movement of the cove molding 10 relative to the back splash 22 and thus, rigidifies the structure.

An adhesive layer 73 is disposed between the shoulder 24 and the back splash bottom wall 36.

A layer of adhesive, generally designated 75, is provided any place a cove molding surface confronts a counter top surface or a back splash surface. More particularly, the adhesive layer 75 includes a layer 76 of suitable adhesive disposed between the confronting bottom wall surfaces 52 and 30, and a layer 78 between the lower part of the back face 64 and the back wall 28, respectively. The adhesive layer 75 also includes an adhesive layer 79 disposed between the confronting top surfaces 70 and 48, a layer 81 of adhesive disposed between the confronting front surfaces 54 and 26, and an adhesive layer 83 between the confronting surfaces 46 and 64.

Normally, a slight excess of adhesive is initially disposed between the confronting wall surfaces of the cove molding 10, the counter top 12 and the back splash 14 which will pass upwardly and outwardly between the confronting wall surfaces as the cove molding 10 is inserted into the slot 22 and the back splash 14 is mounted to seal the cove molding 10 to the counter top 12 and the back splash 14 and provide a water impervious joint which is virtually imperceptible.

It should be understood that although the invention mainly contemplates a joinery molding and method of joining a solid surface counter top to a back splash, that the invention will encompass joining a solid surface bases to another upstanding panel.

THE OPERATION AND METHOD

The counter top 12, which is formed of non-laminated, not coated, plastic solid surfacing material, is horizontally disposed on a suitable base (not shown) with the rear end 18 in abutting confronting relation with a building wall (not shown). The rear end 18 of the counter top 12 is cut to conform to the outline of the building wall against which it is to be abutted. The upper surface 20 of counter top 12 is cut along the rear vertical wall 24 a distance 25 forwardly of the rear counter top end 18 and thence cut along the front wall 22 and the bottom wall 30 to provide the upwardly opening, cove receiving slot 22.

The lower end of the front back splash face 32 is cut along the upwardly rearwardly inclined surface 48 and thence downwardly along the back wall 46 to provide the downwardly and forwardly opening notch 44. The cut providing the surface 49 is a distance 25 from the rear back splash face 34 to provide the rear back splash portion 39 which is equal in depth to the counter top shoulder 24.

The cove molding 10, which is formed in the shape illustrated in FIG. 3 is then coated with excess adhesive 75. Each of the bottom wall surface 51 and back surface 64 of the cove molding 10 is initially coated with an excess layer 76 of suitable adhesive and/or the rear walls 46 and 28 and bottom wall 30 are lined with an excess layer 76 of adhesive. Layers 79 and 81 of adhesive are disposed on the top cove molding face 70 of the vertical leg 68 and on the front 66, of the horizontal leg 50, respectively. The cove molding 10 is then mounted on the counter top 20 by inserting the horizontal leg 50 into the slot 22. The adhesive laden cove molding 10 is forced downwardly into the slot 22 to compress the adhesive layer 75 so that the adhesive 75 is forced upwardly and passes between all of the confronting surfaces of the cove molding and the confronting slot surfaces to completely fill the gap therebetween and seal the surfaces together.

An adhesive layer 79 is disposed on the elongate top cove molding face 70 and an adhesive layer 83 is disposed along the upper portion of the cove molding back face 64. The back splash 32 is then disposed in the position illustrated in FIG. 3 with the notch back wall 46 flush with the rear counter top slot wall 28 and the plane 33 of front back splash face 32 intersecting the slot 22 between the slot wall surfaces 26 and 28. A bead of adhesive 73 is disposed on the upper surface of the counter top shoulder 24 on which the rear back splash portion 39 rests.

Any excess adhesive is removed and/or ground down so that a smooth transition is present between the edges 60 and 70 and the adjoining counter top surface 20 and back splash surface 32 to provide a virtually imperceptible joint. As the adhesive dries, it provides a water pervious joint.

PRIOR ART

Figures 5, 6:
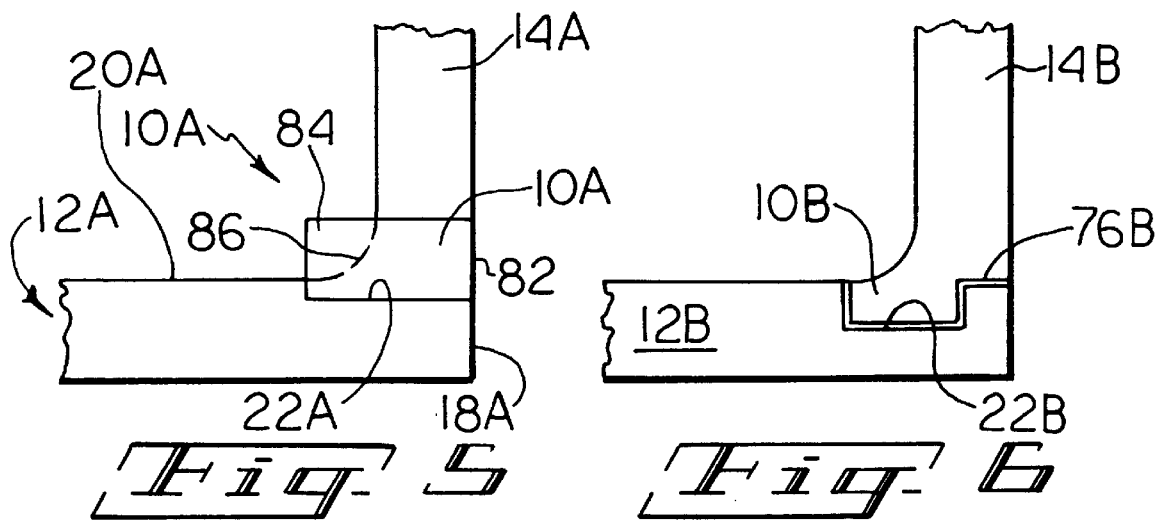
FIG. 5 side elevational view of a prior art construction.
FIG. 6 is a side elevational view of another prior art construction.

One prior art construction is illustrated in FIG. 5 wherein a counter top, generally designated 12A, has an elongate 22A cut into the rear upper edge portion thereof for receiving an elongate rectangular solid block of CORIAN material, generally designated 10A. The back 82 of the block 10A is flush with the counter top rear wall 18A. A back splash 14A rests on an upper surface 20A of the rectangular solid block 10A. A forward portion 84 of the block 12A is cut away with a router along a curvilinear path, illustrated in chain lines at 86, to provide a curvilinear surface. The abutting surfaces of the counter top 12A, block 10A and back splash 14A are glued with suitable adhesive. The embodiment illustrated in FIG. 5 is quite labor intensive and the routing of the front portion 84 of the block 10A requires precision so as not to mar the back splash 14A or counter top 12A.

This method is limited in that relatively thick back splashes must be utilized to provide sufficient exposed lower end surfaces for receiving sufficient adhesive. If relatively thin, i.e. ¼ inch, back splashes are utilized, bonding problems can result.

Another prior art construction, as illustrated in FIG. 6, is disclosed in the aforementioned U.S. Pat. No. 5,432,666, and includes a counter top 12B having a dado 22B cut therein for receiving a shoe 10B integrally coupled to the lower end of the back splash 14B. A layer of adhesive 76B is disposed therebetween as illustrated.

The back splash portions 14B are frequently cut into 12 foot lengths and the user may want only a short piece. Moreover, the user may not want to utilize the relatively expensive CORIAN back splash and may want to substitute a back splash of a different material which cannot be done with this prior art construction because the foot 10B is integral with the back splash 14B.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. A one-piece, elongate joinery insert molding for joining an upstanding panel, such as a back splash, having front and bottom faces provided with a downwardly, forwardly opening notch therein, disposed adjacent to a rear edge portion of a horizontal solid surface base, such as a counter top, having an upwardly opening elongate recess therein, to provide a virtually imperceptible joint between the upstanding panel and the solid surface base and the appearance that the panel, base and insert molding are unitary, said one-piece joinery insert molding comprising:

horizontal leg means for inserting in the upwardly opening recess of the base, and upstanding leg means, integral with said horizontal leg means, including an upper elongate end for inserting in the downwardly, forwardly opening notch of the panel;

said upper elongate end of said upstanding leg means including an upper elongate terminal end surface which is inclined downwardly forwardly for receipt in the downwardly, forwardly opening notch;

said upper elongate end surface having a forward end;

said horizontal leg means including top and front surfaces intersecting at a non-radiused line interface adapted to be disposed flush with the horizontal solid surface base to provide a virtually imperceptible joint between said horizontal leg and the horizontal solid surface base;

said upstanding leg means including a front surface having an upper terminal end intersecting said forward end of said upper end surface at a non-radiused line interface adapted to be disposed flush with said front face of said panel to provide a virtually imperceptible joint between said front surface of said upstanding leg means and the front face of the panel.

2. The joinery insert molding set forth in claim 1 wherein said top surface of said horizontal leg means has a forward edge portion lying in a horizontal plane and said front surface having an upper portion lying in a vertical plane; said non-radiused line surface lying in the intersection of said horizontal plane and said vertical plane.

3. The joinery insert molding set forth in claim 1 wherein said upper end of said upstanding leg means includes means for inhibiting relative forward movement of said elongate cove molding relative to the upstanding panel.

4. The joinery insert molding set forth in claim 1 including an upper curvilinear interface between said vertical and horizontal leg means to provide a curvilinear interface between the base and the front face of the panel.

5. A one-piece joinery insert molding for joining a vertical panel, such as a back splash, to a horizontal solid surface base, such as a counter top, on which the vertical panel is mounted, said solid surface base including an elongate slot in said solid surface, said panel having a front face provided with a frontal, downwardly, forwardly opening notch in the lower terminal end thereof said joinery insert molding comprising:

horizontally disposed leg means for inserting in said elongate slot in said base; and integral upstanding leg means, having an upper terminal end, for inserting in said downwardly, forwardly opening notch, said horizontally disposed leg means having a top surface provided with a forward portion lying in a horizontal plane; and a front vertical surface lying in a vertical plane; the forward portion of said top surface and said vertical surface intersecting at a line lying in each of said vertical and horizontal planes.

6. An elongate molding insert strip adapted to be sealed to a horizontal base, such as a counter top and to a vertical panel, such as a back splash, supported on a rear edge of said base; said base including a generally planar top surface having an upwardly opening dado therein forward of said rear edge, said dado including front and rear surfaces and a planar bottom surface spanning said front and rear surfaces; said vertical back splash including a front face, and a bottom face having a rearward edge supported by said rear edge of said base rearward of said dado, the lower end of said front face of said panel and the forward portion of said bottom face of said back panel being cut away to provide a downwardly and forwardly opening notch, said molding strip comprising:

horizontal leg means for inserting into the dado, having a planar bottom surface for confronting the planar bottom surface of the dado, a forward surface for confronting the front surface of the dado, and an upper surface having a forward end adapted to be disposed flush with the planar top surface of the base to provide a virtually imperceptible joint between said horizontal leg means and the base;

vertical leg means, integral with said horizontal leg means, for inserting into said downwardly and forwardly opening notch in the panel to provide a virtually imperceptible joint between said vertical leg means and the panel;

said vertical leg means including a planar back surface, an upper terminal end surface, and a front surface having an upper terminal end and a lower end forming a smooth transition with said upper surface of said horizontal leg means; and adhesive means for sealing said horizontal leg means to the dado and for sealing said upper terminal end surface to the notch in the panel to provide water impermeable, joints between the molding insert strip and the base and the panel;

said upper terminal end of said front surface being adapted to be disposed flush with the front face of said back splash;

said molding strip comprising non-laminated, plastic solid surface material; said upper terminal end surface being downwardly forwardly inclined and intersecting said upper terminal end of said front surface at a line interface.

7. A one-piece joinery insert molding for joining an upstanding panel, such as a back splash, having a front face lying in a vertical plane and a bottom face provided with a downwardly, forwardly opening notch therein, disposed adjacent to a rear edge portion of a horizontal solid surface base, such as a counter top, having a top surface lying in a horizontal plane including an upwardly opening elongate recess therein, to provide a virtually imperceptible joint between the upstanding panel and the solid surface base and the appearance that the panel, base and insert molding are unitary, said joinery insert molding comprising:

horizontal leg means for inserting in the upwardly opening recess of the base, and upstanding leg means, integral with said horizontal leg means, for inserting in the downwardly and forwardly opening notch of the panel;

said upstanding leg means including
a generally vertical planar back face and
a front face having an upper terminal end adapted to be disposed flush with said front face of the panel;

said horizontal leg means including
a generally planar front face, having an upper terminal end, and
an upper surface having a front terminal end intersecting said upper terminal end of said front face at a forward, upper line edge adapted to be disposed in the horizontal plane flush with the top surface of the counter top.

8. A one-piece elongate joinery insert molding for joining an upstanding panel, such as a back splash, having front and bottom faces provided with a downwardly, forwardly opening notch therein, disposed adjacent to a rear edge portion of a horizontal solid surface base, such as a counter top, having an upwardly opening elongate recess therein, to provide a virtually imperceptible joint between the upstanding panel and the solid surface base and the appearance that the panel, base and insert molding are unitary, said one-piece joinery insert molding comprising:

horizontal leg means for inserting in the upwardly opening recess of the base, and upstanding leg means, integral with said horizontal leg means, for inserting in the downwardly, forwardly opening notch of the panel;

said upstanding leg means including an upper elongate end having an upper elongate terminal end surface which is inclined downwardly forwardly for receipt in the downwardly and forwardly opening notch;

said upper elongate end surface having a forward end;

said horizontal leg means including top and front surfaces intersecting at a non-radiused line interface adapted to be disposed in the horizontal plane flush with the horizontal solid surface base to provide a virtually imperceptible joint between said horizontal leg and the horizontal solid surface base;

said upstanding leg means including a front surface having an upper terminal end intersecting said forward end of said upper end surface at a non-radiused line interface adapted to lie in the vertical plane and disposed flush with the front face of said panel, to provide a virtually imperceptible joint between said upper terminal end and the panel.

9. A one-piece elongate joinery insert molding for an upstanding panel, such as a back splash including a front planar face lying in a plane, and a bottom face having a rearward portion supported by a rear edge portion of a horizontally disposed solid surface base, such as a counter top, provided with an upwardly opening elongate dado therein forwardly adjacent said rear edge portion, the lower end of said front face and the forward end of said bottom face of said panel having a downwardly, forwardly opening notch formed therein, said joinery insert molding comprising:

horizontal leg means for inserting in said dado including a curvilinear top surface having a forward end, said horizontal leg means being adapted to be received in said dado with said forward end of said top surface being flush with the base to provide a virtually imperceptible joint between said horizontal leg and the counter top;

vertical leg means, integral with said horizontal leg means, for inserting in said downwardly, forwardly opening notch having
a back surface,
a curvilinear front surface, forming a smooth transition with said top surface of said horizontal leg means, having an upper terminal end, and
an upper surface spanning said back and front surfaces;

said vertical leg means adapted to be disposed in said downwardly and forwardly opening notch with said upper terminal end of said front surface being flush with the front face of said panel to provide a virtually imperceptible joint between said vertical leg means and the back splash.

10. The joinery insert molding set forth in claim 9 wherein said upper surface of said vertical leg means includes an elongate upper face, having at least a portion which is downwardly, forwardly inclined and intersects said curvilinear front surface at a non-radiused line adapted to be disposed in the plane of the front face, flush with the front face of the panel.

11. The joinery insert molding set forth in claim 10 wherein said top surface of said horizontal leg means includes a forward end lying in a horizontal plane; said horizontal leg means includes an upstanding front planar surface having an upper terminal end lying in a vertical plane and intersecting said forward end of said top surface to provide an upper, forward line edge lying at the intersection of said vertical plane and said horizontal plane.

12. The joinery insert molding set forth in claim 11 wherein said elongate upper face of said vertical leg means includes a forward terminal end joined to said upper terminal end of said front surface to provide an upper forward linear edge adapted to lie in the plane of the front face of the panel.

13. The joinery insert molding set forth in claim 12 wherein said elongate upper face of said vertical leg means lies in a plane which is downwardly, forwardly inclined.

14. An elongate one-piece insert joinery molding comprising:

a horizontal leg having
a bottom planar face,
a front face joined to said bottom planar face; and
a curvilinear top surface intersecting said front face at a forward, upper line interface; and a vertical leg, integral with said horizontal leg, including
a back planar face intersecting said bottom planar face,
a front curvilinear surface flush with said curvilinear top surface to provide a smooth interface therebetween; and
a top end face intersecting said front curvilinear surface at a line interface and also intersecting said back face;

at least a portion of said top end face being forwardly downwardly inclined between said back face and said front curvilinear surface.

15. The elongate one-piece insert joinery molding set forth in claim 14 wherein said front face lies in a vertical plane, said top surface including a forward edge portion lying in a horizontal plane; said line interface lying in said vertical plane and said horizontal plane.

16. The elongate one-piece insert joinery molding set forth in claim 14 wherein said front surface includes a lower end curvilinear surface which is joined to said bottom surface of said horizontal leg via a smooth interface therebetween;

said horizontal and vertical legs comprising non-laminated, plastic solid surface material.

* * * * *